United States Patent
Pollard et al.

(10) Patent No.: US 6,747,749 B1
(45) Date of Patent: Jun. 8, 2004

(54) DOCUMENT REPRINT METHOD AND SYSTEM

(75) Inventors: Larry C. Pollard, Highlands Ranch, CO (US); Kurtis A. Haufschild, Littleton, CO (US); John Owen, Kent, WA (US)

(73) Assignee: Qwest Communications, Denver, CO (US)

(*) Notice: Subject to any disclaimer, the term of this patent is extended or adjusted under 35 U.S.C. 154(b) by 0 days.

(21) Appl. No.: 09/475,511

(22) Filed: Dec. 30, 1999

(51) Int. Cl.[7] .......................... G06F 15/00; G06F 13/00
(52) U.S. Cl. ...................... 358/1.1; 270/58.06; 53/450; 364/478.09; 382/101
(58) Field of Search ...................... 382/101; 270/58.06; 53/450; 364/478.09; 358/1.1

(56) References Cited

U.S. PATENT DOCUMENTS

| | | | |
|---|---|---|---|
| 4,384,196 A | * 5/1983 | McCumber et al. | 235/375 |
| 5,745,590 A | 4/1998 | Pollard | |
| 5,893,129 A | 4/1999 | Pollard | |
| 6,119,051 A | * 9/2000 | Anderson et al. | 700/221 |

\* cited by examiner

Primary Examiner—Edward Coles
Assistant Examiner—Alan Rahimi
(74) Attorney, Agent, or Firm—Brooks Kushman P.C.

(57) ABSTRACT

A method for reprinting a plurality of documents includes obtaining exceptions associated with multiple processed enclosing jobs. The method further includes creating a reprint job that includes documents corresponding to a portion of the exceptions, wherein the portion of the exceptions is associated with at least two of the processed enclosing jobs. A system for reprinting a plurality of documents is also disclosed.

14 Claims, 2 Drawing Sheets

DOCUMENT REPRINT METHOD AND SYSTEM

TECHNICAL FIELD

The invention relates to a method and system for reprinting documents associated with exceptions of multiple processed enclosing jobs, wherein the method and system involve combining the documents into one or more reprint jobs.

BACKGROUND ART

Mass mailings have become common in today's society. Political, charitable and business organizations rely on such mass mailings to communicate effectively with their target audiences. Mass mailings, however, are cost-intensive in terms of both postage and the labor required for their production. Efforts have thus been made to automate mail handling processes to more efficiently print, sort and prepare mail pieces for postage to reduce the associated labor costs.

A typical automated mail handling system includes a computer system to prepare documents for printing, one or more printers for printing the documents, and an enclosing system, which includes one or more enclosing machines and a server, for inserting printed documents and other inserts into envelopes. More specifically, the computer system is used to create or establish multiple print jobs for printing, wherein each print job includes a plurality of documents. Each print job is then processed by a particular printer to create stacks of printed documents, wherein each stack may be referred to as an enclosing job. The enclosing jobs are then processed by a particular enclosing machine using a reference file, such as mail run data file, so as to prepare completed mail pieces.

During processing, however, errors may occur. For example, poor print quality may result in the enclosing system not being able to accurately read bar coding or other identifiers on certain documents. As another example, documents may be damaged or improperly inserted into envelopes by the enclosing system. As a result, a percentage of the mail pieces will not be successfully completed. Such mail pieces, or identifiers associated with such mail pieces, may be referred to as exceptions.

One method of reprocessing these exceptions involves polling the server after each enclosing job has been processed by the enclosing system so as to obtain a list of the exceptions associated with each enclosing job. Documents corresponding to the exceptions are then retrieved from the computer system, and a reprint job is created for each enclosing job. Each reprint job is then processed by a particular printer so as to create additional enclosing jobs. Each additional enclosing job is then processed by a particular enclosing machine using the same reference file that was used to process the corresponding original enclosing job.

Next, the server is polled after each additional enclosing job has been processed to obtain a list of exceptions associated with each additional enclosing job. An additional reprint job is then created and processed as necessary for each additional enclosing job. This process is continued until all mail pieces associated with each original print job have been successfully completed.

Because this method involves creating and processing at least one reprint job for each original print job, wherein each reprint job is a relatively small subset of a respective original print job, the method is time-consuming and costly to implement. Furthermore, if a particular reprint job does not contain enough documents to justify setting up the enclosing system to process the corresponding enclosing job, the enclosing job may need to be manually processed, which may include manually folding and enclosing the documents.

DISCLOSURE OF INVENTION

The invention overcomes the shortcomings of the prior art by providing an improved method and system for reprinting documents that were not properly printed and/or enclosed during prior processing of multiple enclosing jobs. The method and system are significantly more efficient and less costly to implement than prior art methods and system.

Under the invention, a method for reprinting a plurality of documents includes obtaining exceptions associated with multiple processed enclosing jobs; and creating a reprint job that includes documents corresponding to a portion of the exceptions, wherein the portion of the exceptions is associated with at least two of the processed enclosing jobs.

The method may further include sorting the exceptions by statement type. Furthermore, the step of creating a reprint job may include creating a reprint job for each statement type, wherein at least one of the reprint jobs includes documents corresponding to exceptions associated with at least two of the processed enclosing jobs.

Further under the invention, a method for reprinting a plurality of documents includes processing multiple enclosing jobs; obtaining exceptions associated with each of the enclosing jobs; creating a reprint job that includes documents associated with the exceptions; and processing the reprint job so as to reprint each of the documents.

The step of processing multiple enclosing jobs may include processing multiple enclosing jobs through one enclosing machine, or through multiple enclosing machines disposed at the same or different locations. Thus, the method of the invention may be utilized to effectively handle document reprinting for multiple locations.

Moreover, the step of processing multiple enclosing jobs may include processing at least one enclosing job that includes documents associated with another reprint job. Advantageously, then, reprint jobs and associated enclosing jobs may be processed in the same manner as print jobs and associated enclosing jobs so as to provide closed loop processing of exceptions.

Further under the invention, a method for reprinting a plurality of documents includes processing multiple enclosing jobs; obtaining exceptions for each of the enclosing jobs; sorting the exceptions by statement type; creating a single reprint job for each statement type, each reprint job including documents associated with exceptions of a particular statement type; and processing each of the reprint jobs so as to reprint each of the documents.

A system according to the invention for reprinting multiple documents includes a computer and an enclosing subsystem in communication with the computer. The computer includes instructions for obtaining exceptions for multiple processed enclosing jobs from the enclosing subsystem, and instructions for creating a reprint job that includes documents corresponding to at least a portion of the exceptions, the at least a portion of the exceptions being associated with at least two of the processed enclosing jobs.

The computer may further include instructions for sorting the exceptions by statement type. Furthermore, the instructions for creating a reprint job may include instructions for creating a reprint job for each statement type such that at least one of the reprint jobs includes documents corresponding to exceptions associated with at least two of the processed enclosing jobs.

The system may further include at least one printer in communication with the computer. Moreover, the computer may further include instructions for processing each of the reprint jobs so as to reprint each of the documents on the at least one printer.

These and other objects, features and advantages of the invention are readily apparent from the following detailed description of the best modes for carrying out the invention when taken in conjunction with the accompanying drawings.

BEST MODES FOR CARRYING OUT THE INVENTION

Figure 1:
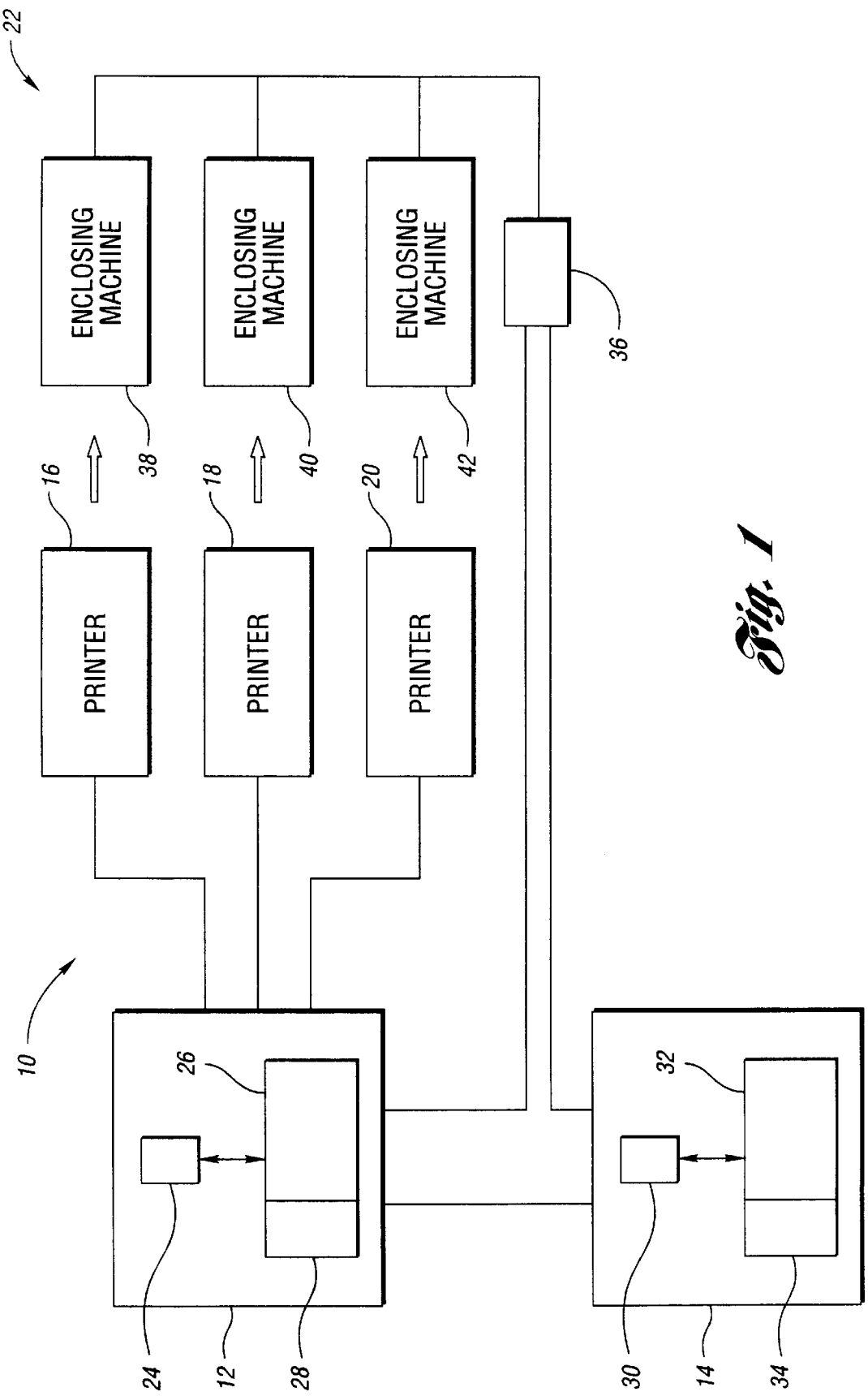
FIG. 1 is a schematic diagram of a system according to the invention for reprinting and enclosing a plurality of documents.

FIG. 1 shows a system 10 for reprinting and enclosing a plurality of documents according to the invention. For example, telecommunication companies, which engage in large-scale mailings, often need to reprint and enclose damaged, lost, or low-quality customer invoices. The system 10 may, however, be used to reprint and enclose any suitable documents, such as telephone usage summary reports, account statements and insurance statements. The system 10 includes a first or main computer 12; a second or reprint computer 14 in communication with the main computer 12; first, second and third printers 16, 18 and 20, respectively, in communication with the main computer 12; and a inserting or enclosing subsystem 22 in communication with the main computer 12 and the reprint computer 14.

The main computer 12 preferably includes a processor 24 in communication with various computer readable storage media 26. The computer readable storage media 26 may include any of a number of known devices that function as a read-only memory (ROM), random access memory (RAM), keep-alive memory (KAM), and the like. The computer readable storage media 26 may include data representing program instructions (software), such as an accounting application system 28, and data representing documents such as customer invoices.

The reprint computer 14 may be located at the same location as the main computer 12, or at a different location. Similar to the main computer 12,.the reprint computer 14 includes a processor 30 in communication with various computer readable storage media 32. Similar to the main computer 12, the computer readable storage media 32 may include any of a number of known devices that function as a read-only memory (ROM), random access memory (RAM), keep-alive memory (KAM), and the like. The computer readable storage media 32 may include data representing program instructions (software), such as a reprint program 34 that is explained below in greater detail. Alternatively, the reprint program 34 may be incorporated into the main computer 12, and the reprint computer 14 may be eliminated.

The printers 16, 18 and 20 are preferably high speed printers that are configured to receive rolls of paper for printing, and are further configured to provide folded stacks of paper as output. Such printers are available from IBM Corporation of Armonk, N.Y. Alternatively, the printers 16, 18 and 20 may be any suitable type of printer. Furthermore, although the system 10 is shown with three printers 16, 18 and 20, the system 10 may be provided with any suitable number of printers that are located in the same location or different locations.

The enclosing subsystem 22 includes a controller, such as a server 36, and first, second and third inserting or enclosing machines 38, 40 and 42, respectively, in communication with the server 36. The enclosing machines 38, 40 and 42 are preferably configured to receive the stacks of paper from the printers 16, 18 and 20, as well as pre-printed inserts. Each enclosing machine 38, 40 and 42 is also preferably configured to separate or cut a particular stack of paper into a plurality of documents, such as customer invoices, and to enclose each of the documents in an envelope along with any appropriate inserts. Although the enclosing subsystem 22 is shown with three enclosing machines 38, 40 and 42, the enclosing subsystem 22 may be provided with any suitable number of enclosing machines that are located at the same location or different locations. Furthermore, the enclosing subsystem 22 is available from Pitney Bowes Corporation of Stamford, Conn.

Figure 2:
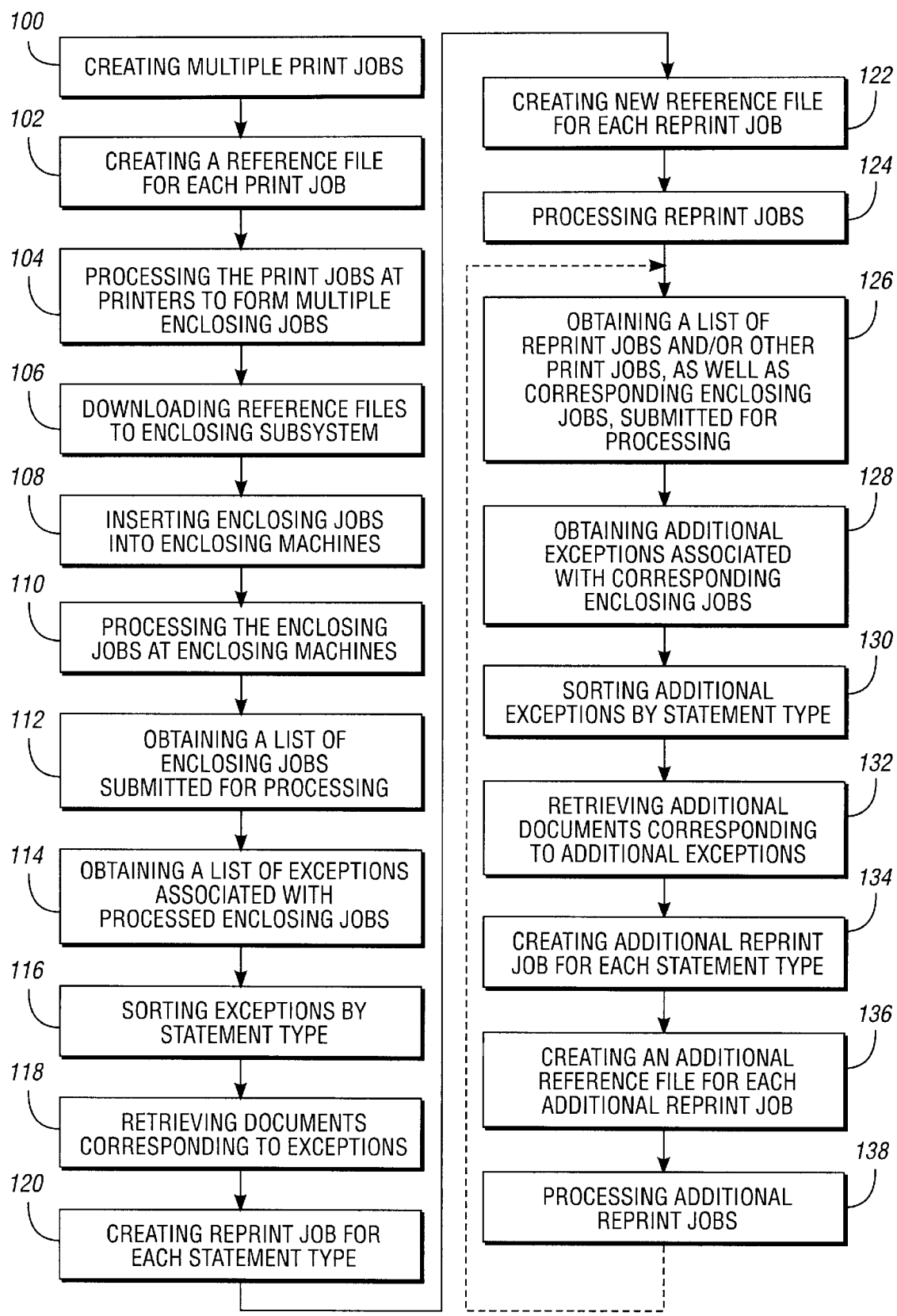
FIG. 2 is a flow chart illustrating operation of a method according to the invention for reprinting and enclosing a plurality of documents.

FIG. 2 is a flow chart that illustrates operation of a method or system, such as the system 10, for reprinting and enclosing a plurality of documents according to the invention. Referring to FIGS. 1 and 2, the method includes creating multiple print files or print jobs, as indicated at step 100, using the accounting system 28, or other suitable program or system. Each print job preferably includes documents, such as customer invoices, of the same statement type so that all documents in a particular print job can be printed on the same type of paper. For example, one print job may include residential invoices, another print job may include commercial invoices, and still another print job may include bilingual invoices. As another example, print jobs may be created or organized based on other features or characteristics such as document page count and/or postal discount category.

At step 102, the method continues by creating a reference file, such as a mail run data file, for each print job. Each reference file preferably, but not necessarily, includes all necessary information and instructions for enclosing printed documents associated with a particular print job. For example, each reference file may include entries or records that correspond to documents in the particular print job, and each record may indicate the number of pages and the postal category associated with a particular document, as well as which inserts are to be enclosed with the particular document. Furthermore, each print job preferably contains identifiers that identify the associated reference file as well the records that correspond to the documents in the particular print job. For example, such identifiers may include file names of the reference files, and sequential numbers corresponding to records of the reference files.

At step 104, the method continues by processing the print jobs at the printers 16, 18 and 20 so as to print the documents and to arrange the printed documents in groups, such as stacks. The identifiers described above are preferably printed on the documents as scan codes, which are readable by the enclosing subsystem 22 as explained below in greater detail. Preferably, each processed print job yields one group or stack of printed documents, which may be referred to as an enclosing job. Thus, each processed print job preferably yields one enclosing job.

Next, at step 106, the reference files associated with the print jobs and corresponding enclosing jobs are downloaded to the server 36 of the enclosing subsystem 22. At step 108, the enclosing jobs are inserted or otherwise loaded into the enclosing machines 38, 40 and 42, along with inserts and envelopes as indicated by the reference files. At step 110, the enclosing machines 38, 40 and 42 then process the enclosing jobs so as to create completed mail pieces. For example, the enclosing machines 38, 40 and 42 may separate or cut each enclosing job into separate documents. Furthermore, the enclosing machines 38, 40 and 42 may fold the documents, collate the documents and insert or enclose each document in an envelope along with an insert or inserts identified by the associated reference file.

During processing of a particular enclosing job, the scan codes printed on the corresponding documents are read or otherwise scanned by one of the enclosing machines 38, 40 and 42, so that each document can be cross-referenced with the corresponding record in the associated reference file. Each document may then be properly enclosed based on information provided by the associated reference file. Additional details regarding use of scan codes is disclosed in U.S. Pat. No. 5,745,590, which is hereby incorporated by reference.

At step 112, the reprint program 34 accesses a job inventory data base of the main computer 12 to obtain a list of print jobs and/or enclosing jobs that have been submitted for processing. The reprint program 34 then interrogates or polls error files of the server 36 to obtain lists of exceptions associated with completed or processed enclosing jobs, as indicated at step 114. As used herein, the term exceptions refers to identifiers that correspond to documents that were not properly processed by the enclosing subsystem 22. For example, exceptions may be file names or numbers of documents that were damaged or lost during the printing or enclosing processes. Preferably, the reprint program 34 is configured to operate in real time so that the reprint program 34 is able to obtain exceptions for a particular enclosing job immediately after the enclosing job has been processed by one of the enclosing machines 38, 40 and 42.

Next, at step 116, the reprint program 34 organizes or sorts exceptions of multiple processed enclosing jobs by statement type. The reprint program 34 then automatically retrieves documents corresponding to the exceptions from multiple data files on the main computer 12, as indicated at step 118. The reprint program 34 also preferably creates a single reprint job for each statement type, as indicated at step 120, such that each reprint job includes all documents corresponding to all exceptions of a particular statement type. For example, after multiple enclosing jobs of a particular statement type have been processed by one or more enclosing machines 38, 40 and 42, the reprint program 34 preferably creates a single reprint job that includes all documents corresponding to exceptions of the particular statement type. The reprint program 34 may also create multiple reprint jobs for a particular statement type if, for example, the number of exceptions of the particular statement type is sufficiently large such that multiple reprint jobs are necessary for proper processing. Alternatively, the reprint program 34 may be configured to combine exceptions in any suitable manner in order to create reprint jobs.

At step 122, the reprint program 34 also creates a new reference file for each reprint job. Preferably, but not necessarily, each new reference file only contains records corresponding to the documents of a particular reprint job. These new reference files are used to process enclosing jobs that correspond with the reprint jobs. Furthermore, each reprint job preferably includes identifiers that identify the associated new reference file as well the records that correspond to the documents in the particular reprint job.

Next, at step 124, the reprint jobs may be added to the job inventory data base of the main computer 12, along with other print jobs, and are processed in the same manner as described above with respect to the print jobs. At step 126, the reprint program 34 again accesses the job inventory data base to obtain a list of reprint jobs and/or other print jobs, as well as corresponding enclosing jobs, that have been submitted for processing. At step 128, the reprint program 34 then obtains additional exceptions associated with the corresponding enclosing jobs after the corresponding enclosing jobs have been processed. Next, the reprint program 34 sorts the additional exceptions by statement type, as indicated at step 130. At step 132, the reprint program 34 automatically retrieves additional documents corresponding to the additional exceptions from the main computer 12. Again, the reprint program 34 also preferably, but not necessarily, creates a single additional reprint job for each statement type, as indicated at step 134. Furthermore, at step 136, the reprint program 34 also creates an additional reference file for each additional reprint job, and the additional reference files are used to process additional enclosing jobs that correspond with the additional reprint jobs.

Next, at step 138, the additional reprint jobs may be added to the job inventory data base of the main computer 12, and are processed in the same manner as described above with respect to the print jobs. This process may be continued until all documents associated with the original print jobs have been successfully printed and enclosed.

Furthermore, the reprint program 34 may also determine how to process reprint jobs and associated enclosing jobs based on document volume, timing requirements and/or other considerations. For example, if the number of documents contained in a particular reprint job is below a predetermined number, the reprint program 34 may send the particular reprint job to a cut-sheet printer, which provides cut, printed documents as output. These cut, printed documents, which may also be considered an enclosing job, may then be manually folded and enclosed.

Advantageously, because the method of the invention preferably involves creating a single reprint job for multiple processed enclosing jobs of the same statement type, the method is significantly more efficient than prior art systems and methods that involve creating a reprint job for each processed enclosing job. Furthermore, because reprint jobs are processed like print jobs, and because exceptions associated with reprint jobs can be combined with exceptions associated with print jobs to create one or more additional reprint jobs, the method of the invention provides closed loop processing of exceptions.

According to another feature of the invention, the reprint program 34 may be scheduled to run at any desired time and/or frequency. For example, the reprint program 34 may run once a day for five days, or two times per day on alternating days. Such flexibility provides optimum reprint processing.

According to yet another feature of the invention, the reprint program 34 may be configured to communicate with multiple main computers, printers and enclosing machines at different locations. Consequently, the reprint program 34 can efficiently handle reprint processing for multiple locations.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for reprinting a plurality of documents, the method comprising:
   obtaining exceptions associated with multiple processed enclosing jobs;
   sorting the exceptions by statement type; and
   creating at least one reprint job that includes documents corresponding to a portion of the exceptions, wherein the portion of the exceptions is associated with at least two of the processed enclosing jobs, and wherein a reprint job is created for each statement type.

2. The method of claim 1 wherein creating a reprint job comprises creating the reprint job such that the reprint job includes documents corresponding to all of the exceptions.

3. The method of claim 1 further comprising:
   processing the reprint job so as to create an enclosing job; and
   determining whether the enclosing job is to be processed by an enclosing machine.

4. The method of claim 3 wherein processing multiple enclosing jobs includes processing multiple enclosing jobs using multiple reference files, one reference file for each enclosing job, and wherein the method further includes:
   processing the reprint job to form an additional enclosing job;
   creating an additional reference file different than any of the multiple reference files, the additional reference file including information for processing the additional enclosing job; and
   processing the additional enclosing job using the additional reference file.

5. A method for reprinting a plurality of documents, the method comprising:
   processing multiple enclosing jobs;
   obtaining exceptions associated with each of the enclosing jobs;
   sorting the exceptions by statement type;
   creating a single reprint job for each statement type, each reprint job including documents associated with exceptions of a particular statement type; and
   processing each of the reprint jobs so as to reprint each of the documents.

6. The method of claim 5 wherein processing multiple enclosing jobs includes processing multiple enclosing jobs through a first enclosing machine of an enclosing system.

7. The method of claim 6 wherein obtaining exceptions associated with each of the enclosing jobs includes obtaining the exceptions from at least one error file of the enclosing system.

8. The method of claim 5 wherein processing multiple enclosing jobs includes processing multiple enclosing jobs through multiple enclosing machines of an enclosing system.

9. The method of claim 5 wherein processing multiple enclosing jobs includes processing at least one enclosing job that includes documents associated with another reprint job.

10. The method of claim 5 wherein obtaining exceptions includes obtaining exceptions associated with each of the enclosing jobs immediately after processing each of the enclosing jobs.

11. The method of claim 5 wherein processing each of the reprint jobs includes arranging the documents by statement type to form a single additional enclosing job for each statement type.

12. The method of claim 11 further comprising:
    creating a single reference file for each statement type, each reference file including records corresponding to documents of a particular statement type; and
    processing each additional enclosing job using a corresponding reference file;
    wherein creating a single reprint job for each statement type includes creating each reprint job such that each reprint job includes an identifier for identifying a particular reference file.

13. A system for reprinting multiple documents, the system comprising:
    a computer;
    at least one printer in communication with the computer; and
    an enclosing subsystem in communication with the computer;
    wherein the computer includes instructions for obtaining exceptions for multiple processed enclosing jobs from the enclosing subsystem, and instructions for creating a reprint job that includes documents corresponding to at least a portion of the exceptions, the at least a portion of the exceptions being associated with at least two of the processed enclosing jobs; and
    wherein the computer further includes instructions for processing each of the reprint jobs so as to reprint each of the documents on the at least one printer.

14. A system for reprinting multiple documents, the system comprising:
    a computer; and
    an enclosing subsystem in communication with the computer;
    wherein the computer includes instructions for obtaining exceptions for multiple processed enclosing jobs from the enclosing subsystem, and instructions for creating a reprint job that includes documents corresponding to at least a portion of the exceptions, the at least a portion of the exceptions being associated with at least two of the processed enclosing jobs; and
    wherein the computer further includes instructions for sorting the exceptions by statement type, and wherein the instructions for creating a reprint job include instructions for creating a reprint job for each statement type such that at least one of the reprint jobs includes documents corresponding to exceptions associated with at least two of the processed enclosing jobs.

* * * * *